(No Model.)
J. W. GREENE.
TREE APPLIANCE FOR DESTROYING INSECTS.
No. 561,391. Patented June 2, 1896.
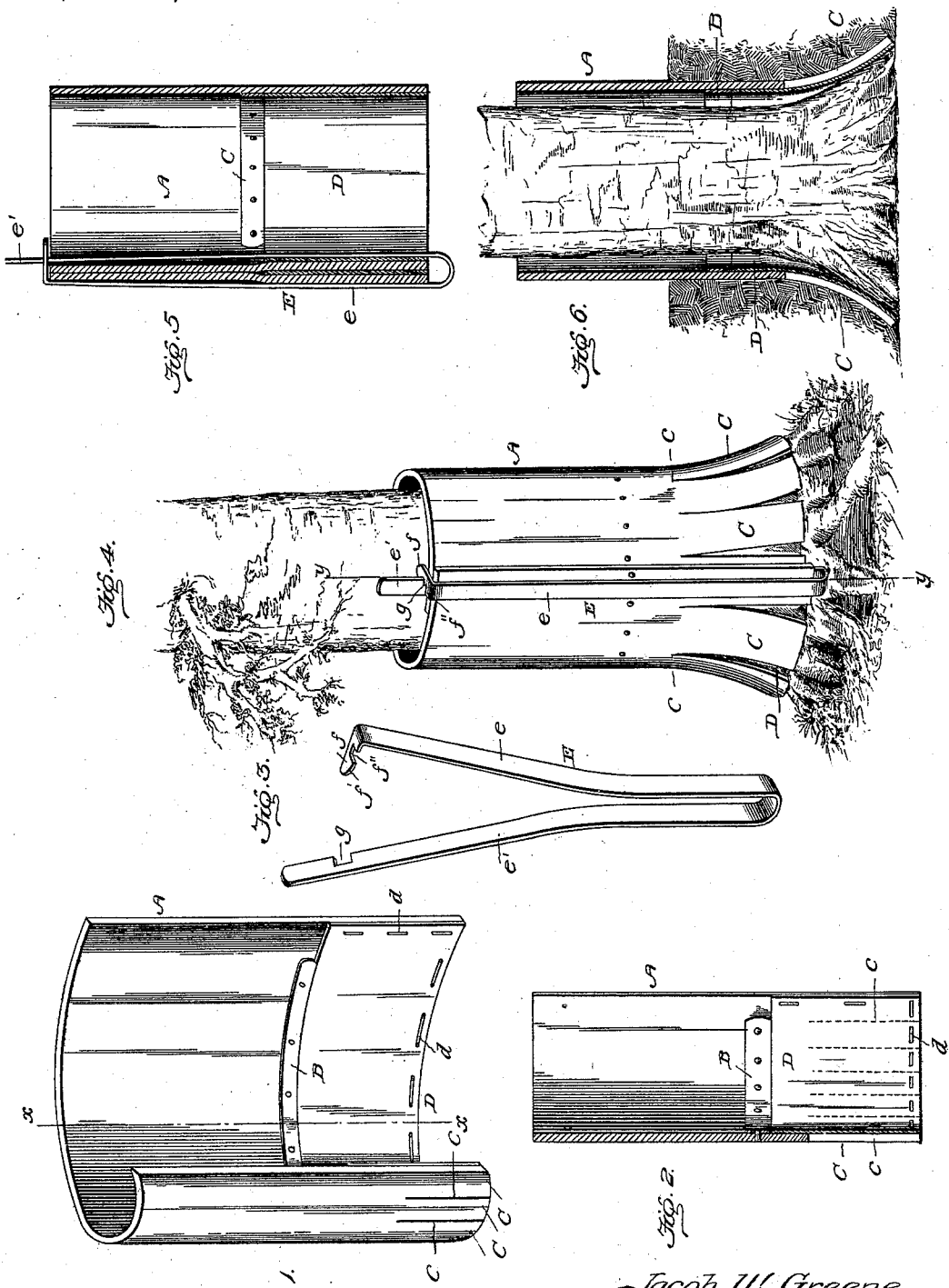
Witnesses:
Jacob W. Greene
Inventor
Attys

UNITED STATES PATENT OFFICE.

JACOB W. GREENE, OF TRENTON, MISSOURI.

TREE APPLIANCE FOR DESTROYING INSECTS.

SPECIFICATION forming part of Letters Patent No. 561,391, dated June 2, 1896.

Application filed December 31, 1895. Serial No. 573,920. (No model.)

*To all whom it may concern:*

Be it known that I, JACOB W. GREENE, a citizen of the United States, residing at Trenton, in the county of Grundy and State of Missouri, have invented certain new and useful Improvements in Tree Appliances for Destroying Insects; and I do hereby declare the following to be a full, clear, and exact description of the invention, such as will enable others skilled in the art to which it appertains to make and use the same.

The object that I have in view in the present invention is the provision of means for the purpose of retaining for a short period of time a liquid insecticide around a tree-trunk and its stump-roots long enough to destroy tree-borers and other insects, their eggs, and fungus parasites.

A further object of the invention is to so construct the appliance that it can be easily adjusted to trees which may differ in sizes within certain limits and in a manner to inclose the roots, so that the liquid insecticide will not run off; and a further object is to make the appliance simple in construction and cheap of manufacture.

With these ends in view my tree appliance consists of a jacket or sheath having an expansible foot and means for closing the spaces or openings formed by the expansion of the foot.

The invention further consists of a jacket or sheath having one edge incised with a number of slits, forming tongues adapted to spread out and inclose the roots of the tree, and an elastic dam united to the sheath in a manner to expand with the tongues and yet operate to close the spaces or slits between the tongues when they are spread out to fit around the roots.

The invention further consists in a tree appliance comprising a pliable jacket or sheath provided with an expansible foot and a dam to close the spaces formed by expanding said foot and a clamp adapted to be applied lengthwise to the overlapped edges of the sheath or jacket; and it finally consists of the novel construction and combination of parts, which will be hereinafter fully described and claimed.

To enable others to understand my invention, I have illustrated the preferred embodiment of the same in the accompanying drawings, forming a part of this specification, and in which—

Figure 1 is a perspective view of the jacket or sheath forming a part of my improved tree appliance. Fig. 2 is a vertical sectional view through the jacket on the plane indicated by the dotted line *x x* of Fig. 1. Fig. 3 is a detail view of the preferred construction of the clamp. Fig. 4 is a view showing my appliance adjusted to a tree; and Fig. 5 is a sectional view on the plane indicated by the dotted line *y y* of Fig. 4 to show how the clamp operates to securely confine the meeting edges of the jacket or sheath. Fig. 6 is a vertical sectional view through my tree appliance, showing it applied to the tree-trunk and indicating the manner of packing the soil around the appliance.

Like letters of reference denote corresponding parts in all the figures of the drawings, referring to which—

A designates the jacket or sheath of my appliance to be adjusted around a tree-trunk to confine or hold for a short time a liquid insecticide, which is to be poured into the jacket and operate to destroy insects, fungus parasites, &c. This jacket or sheath consists of a piece of leather, rubber fabric, or any other appropriate material which can be bent or folded into approximately cylindrical form to inclose a tree-trunk. The sheath or jacket is of proper length and width to enable it to be adjusted around the tree and have the edges thereof overlap one another and to inclose the tree-trunk high enough to afford the insecticide opportunity to act upon the parts of the tree-trunk affected by the insects, &c.

To give the pliable jacket or sheath sufficient elasticity, as well as to strengthen the same, I provide a spring B, which is applied, preferably, to the inside of the jacket longitudinally of the same and on a line about midway between its top and bottom edges, and this spring B is secured in place by staples, rivets, or other suitable fasteners.

The lower edge of the jacket or sheath is made expansible to adapt it better to fit around and inclose the stump-roots, and in the preferred embodiment of my appliance this expansibility is attained by making a number of slits or incisions c, which extend upward from the lower edge of the jacket, thereby forming a number of tongues C. When the jacket is applied to the tree-trunk, these tongues spread out or expand to inclose the stump-roots, thus leaving openings or spaces between the tongues. In order to close these openings or spaces and better enable the appliance to retain the liquid insecticide, I provide a dam D. This dam is in the form of a length of imperforate flexible elastic sheet-rubber, applied, preferably, to the inner surface of the jacket, so as to cover the area from the lower slitted edge up to the stiffening-spring B and from end to end of the jacket. This dam at its upper edge is held in place and preferably within the jacket or sheath by cement, stitching, or other suitable way; but I prefer to fasten the dam to the tongues by individual fasteners, as at d, thus allowing the elastic dam to be stretched in its entirety when the tongues are expanded, but the dam remains continuous, so as to prevent the liquid from escaping through the spaces between the tongues.

The jacket when fitted around the tree-trunk is held in place by means of a clamp E, which holds the lapped edges of the jacket together. In the preferred construction of this clamp I make or bend it from a single length of metal or other spring material, forming the two arms e e'. One arm, e, is shorter than the other arm, e', and the free end of this short arm is bent to form the latch-lip f, which stands substantially at right angles to the length of the arm e. This latch f has a beveled face or edge f' and a notch f'' in rear of this beveled face. The long arm e' is formed at a suitable point with a notch g, which receives the notched latch f on the arm e when the clamp is applied to the jacket. The clamp has one or both of its arms bent to approach each other at points between the heel or bend and the latch of the clamp, in order that the middle portion of the clamp may firmly bind against the lapped edges of the jacket or sheath. In adjusting the clamp to the jacket after the latter has been applied around the tree-trunk the long arm e' of the clamp is slipped between the tree-trunk and the jacket and the arm e is forced inward, so that the beveled latch f rides against the notched part g of the arm e, the inward pressure on the arm e and latch being continued until the notched edge f'' of the latch slips into the notched part g of the arm e'.

The mode of using my appliance is as follows: The loose soil is scraped from the roots of the tree, after which the remaining dirt should be moistened a little and is tramped down firmly with the foot. The pliable jacket or sheath is now adjusted around the tree-trunk, so as to have its edges overlap one another and so as to leave a space of about half an inch between the jacket and the tree, after which the clamp E is adjusted in the manner described in order to engage with the lapped edges of the jacket and prevent the jacket from slipping out of place. The jacket and clamp are now dropped upon the ground, so as to permit the tongues and dam to spread out and inclose all the prominent roots that may be in the way. The soil previously scraped away from the roots or other soil should now be scraped back against the jacket and its expanded tongues, and this soil should now be tamped tightly with the foot or by a tamp-stick for a short distance above the stiffening-spring until all is measurably water-tight. After the appliance has been properly adjusted hot water or other insecticide is poured into the jacket until it is filled, and the liquid is supplied from time to time as it settles down by absorption into the ground. If the worm-holes have previously been partially opened by the partial removal of the "bug-dust," two minutes will ordinarily be long enough to scald or poison the worms and destroy all fungus parasites.

I am aware that changes in the form and proportion of parts and in the details of construction of the appliance herein shown and described as the preferred embodiment of my invention may be made by a skilled mechanic without departing from the spirit or sacrificing the advantages of the invention, and I therefore reserve the right to make such alterations and modifications as fairly fall within the scope of my invention.

Having thus fully described my invention, what I claim as new, and desire to secure by Letters Patent, is—

1. A tree appliance comprising a jacket or sheath having an expansible foot and means for closing the spaces or openings formed by the expansion of said foot, as and for the purposes described.

2. A tree appliance comprising a jacket or sheath having an expansible foot and a dam for closing the spaces in the foot.

3. A tree appliance comprising a jacket having a series of slits forming a series of tongues and an elastic dam united to the jacket to close the spaces between the tongues.

4. A tree appliance comprising a jacket or sheath having a series of slits or incisions forming a series of tongues, and an elastic dam secured to the sheath or jacket and fastened to the individual tongues thereof.

5. A tree appliance comprising a pliable jacket or sheath provided with an expansible foot and a dam to close the spaces formed by expanding said foot, and a clamp adapted to be applied lengthwise to the overlapped edges of said sheath or jacket, substantially as and for the purposes described.

6. A tree appliance comprising a jacket or sheath having a series of tongues at one edge, a stiffening-spring, an elastic dam secured over the tongues to close the spaces between the same, and a clamp to hold the jacket or sheath in place, substantially as described.

In testimony whereof I affix my signature in presence of two witnesses.

JACOB W. GREENE.

Witnesses:
   J. E. WILSON,
   F. C. DOBYUS.